June 26, 1956      R. F. PLOTT      2,751,780
LEAKAGE TESTING APPARATUS

Filed March 17, 1945      2 Sheets-Sheet 1

Inventor:
Robert F. Plott
By Robert A. Lavender
Attorney

June 26, 1956 R. F. PLOTT 2,751,780
LEAKAGE TESTING APPARATUS
Filed March 17, 1945 2 Sheets-Sheet 2
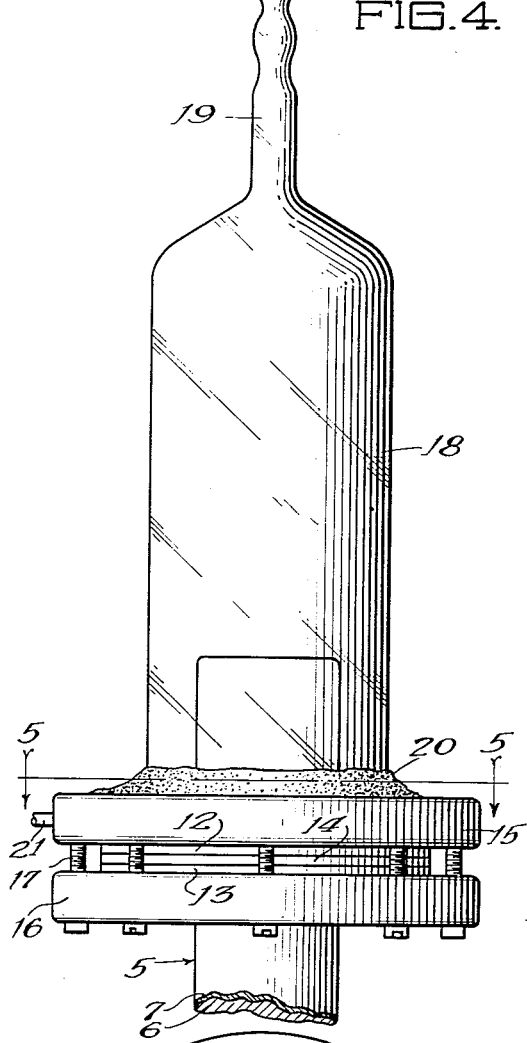
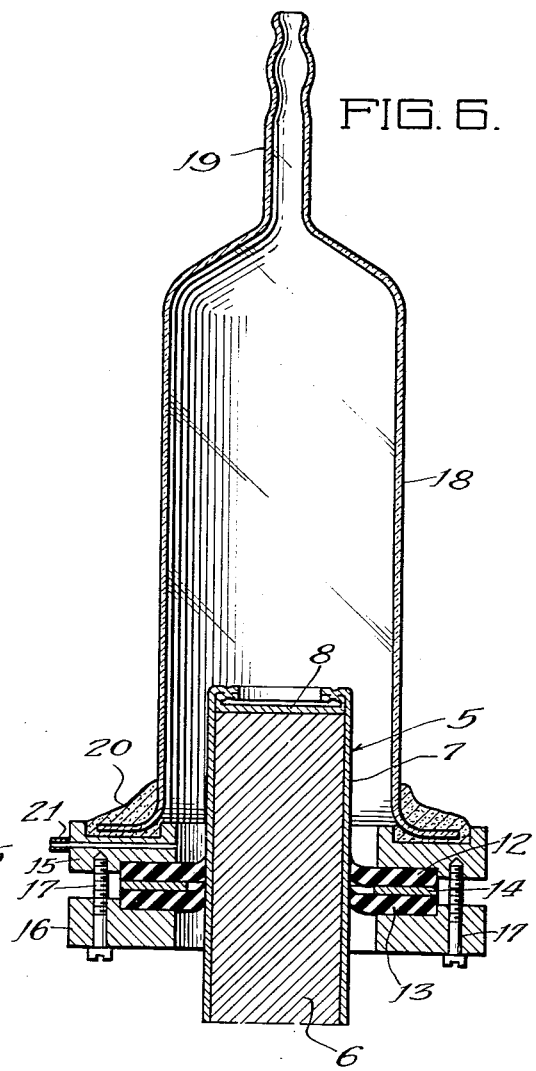
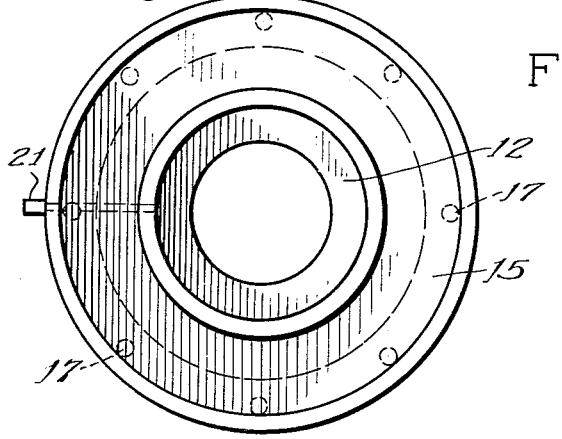
Inventor:
Robert F. Plott,
By: Robert A. Lanensla
Attorney

United States Patent Office 2,751,780
Patented June 26, 1956

2,751,780

LEAKAGE TESTING APPARATUS

Robert F. Plott, Chicago, Ill., assignor to the United States of America as represented by the United States Atomic Energy Commission Application March 17, 1945, Serial No. 583,275

3 Claims. (Cl. 73—49.2)

My invention relates to an apparatus for testing a sheathed object for suspected leaks through the sheath. More specifically, it relates to apparatus for vacuum testing a metallic sheath closely surrounding an object to determine whether the sheath is gas-tight and free from leaks.

In the past, various methods and apparatus have been devised for testing objects, such as containers, for leaks therethrough such as, for example, by noting bubble formation after submerging the containers in a liquid-containing vessel that has been evacuated. Such apparatus and methods, on the whole, have had the serious disadvantage of being time consuming, therefore not especially suited for large scale testing operations.

An object of my invention is to provide an apparatus for rapid testing of sheathed objects so as to be suitable for large scale production.

Other objects and advantages will become more apparent from the following description taken together with the drawings, wherein:

Fig. 4 is a longitudinal view of a modified form of leak testing apparatus;

Fig. 5 is a plan view with members 18 and 5 removed taken on line 5—5 of Fig. 4; and Fig. 6 is a longitudinal cross-sectional view of the apparatus shown in Fig. 4.

Figure 1:
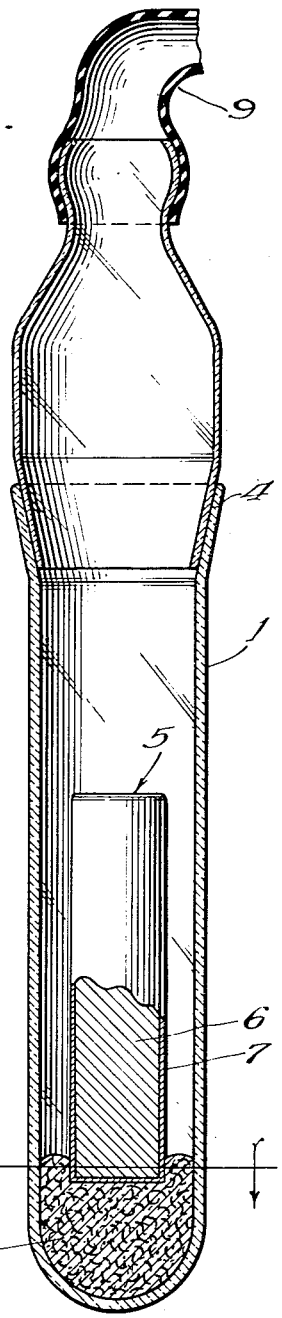
Fig. 1 is a longitudinal view partly in cross-section of an apparatus suitable for vacuum testing a sheathed object.
Figure 2:
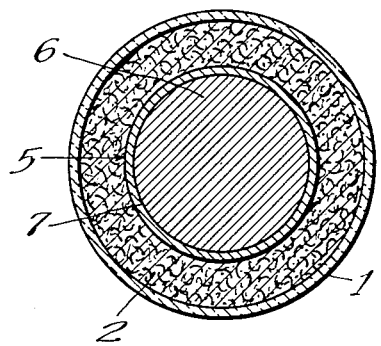
Fig. 2 is an enlarged cross-sectional view taken along line 2—2 of Fig. 1.
Figure 3:
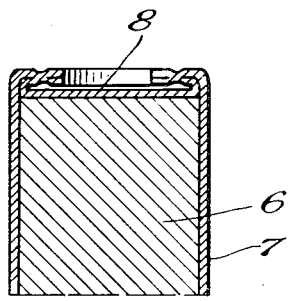
Fig. 3 is an enlarged cross-sectional view of the upper portion of the sheathed object shown in Fig. 1.

Referring to Figs. 1, 2 and 3, numeral 1 denotes a transparent vessel or container of glass, Pyrex or other suitable material. At the bottom of vessel 1 there is provided a cushion of felt or other suitable material 2 for supporting and cushioning the bottom of vessel 1 against shock when a sheathed object or slug 5 is dropped therein. A readily detachable ground glass joint 4 is provided for introducing object 5 into vessel 1 which joint is held together by virtue of the differential pressure between the inside and outside of vessel 1 and may be made tight by use of a vacuum sealing compound. The sheathed object 5 may comprise, for example, a cylindrical slug of uranium or other material 6 surrounded by a sheath portion 7 of aluminum or other metal, the latter forming a gas-tight sheath by the use of a cap 8 joined to the sheath by a seam weld, for example. After welding the edges of the sheath and cap are spun over the end of the slug.

The operation of the seal testing device is as follows. Before object 5 is introduced into vessel 1, it is coated with a thin film of bubble forming liquid such as a soap solution, or odorless kerosene. In general, any liquid having low viscosity and low surface tension, that markedly wets the sheath, and that will not boil as the result of evacuation of vessel 1, is a suitable bubble forming liquid. Vessel 1 is then evacuated through a rubber hose connection 9 that is connected to a suitable vacuum pump (not shown). In the event of leakage through the sheath portion 7 or cap 8 or the welded joint, bubbles will be formed through the aforementioned liquid film by virtue of the lower external pressure surrounding sheath 7—8 as the result of the evacuation of the surrounding atmosphere.

Figs. 4, 5 and 6 show a modification of the apparatus shown in Figs. 1 and 2. The sheathed slug 5 is supported by two apertured gaskets, 12 and 13 of any suitable plastic material such as, for example, "neoprene" or live rubber cut under uniform peripheral stress. The gaskets are spaced by means of a metallic annulus 14 of brass or other suitable material. Parts 12, 13 and 14 are clamped between two metal flanges 15 and 16 of brass, for example, and are secured together by bolts 17. Sealed to the upper surface of flange 15 by a suitable metal-to-glass sealing material 20 is a transparent vessel of glass, Pyrex, or other suitable material 18. A suitable metal-to-glass sealing material is "Sealstix," a highly tempered shellac. Vessel 18 has a nozzle 19 formed at the upper end thereof which can be readily attached to a vacuum pump by means of a hose (not shown).

In order to test slug 5 for airtightness of its sheath 7—8 one end of the slug is thrust upwardly through the gaskets 12 and 13. The apertures in the gaskets are of slightly smaller diameter than that of the sheath portion 7, hence providing a tight frictional grip on a peripheral portion thereof. Kerosene, a soap solution, or other suitable bubble forming liquid such as described in connection with the embodiment shown in Figs. 1, 2 and 3 is then pumped through port 21 by a suitable pump (not shown) into vessel 18 until the top of slug 5 is covered. A vacuum pump (not shown) is then attached to nozzle 19 and the vessel 18 is evacuated. Bubbles will form and rise through the liquid in the event of the existence of one or more leaks through the sheath. When the test is completed, the vacuum is removed, the kerosene is pumped out through port 21 by reversing the pump for introducing it. Slug 5 is then pulled downwardly, turned upside down and the other end is inserted through gaskets 12 and 13. The process is then repeated so as to test the last mentioned portion of the slug for leaks in the same manner as the first mentioned portion thereof. If only the cap 8 or the welded joint between sheath portions 7—8 is to be tested, the liquid may be applied instead, for example, as a coating on the welded end of the slug, before the slug is pushed through gaskets 12 and 13. Moreover the entire slug may be immersed in a pool of liquid and tested if desired.

Thus I have provided an efficient apparatus for testing for leaks through sheaths of sheated objects which apparatus is suitable for large scale testing by virtue of the speed with which the test may be carried out.

It should be noted that others skilled in the art, after having had the benefit of the teachings of my invention, may become aware of equivalents such as equivalent bubble forming liquids or substantially equivalent seal structures, without departing from the spirit of my invention. For this reason, the present invention should not be restricted except insofar as set forth in the following claims.

I claim:

1. Apparatus for testing leakage of the end of a container comprising, in combination: an inverted bell-shaped vessel having a transparent portion; a base sealed in fluid-tight relationship to the open end of said vessel; an aperture in said base, said aperture being adapted to receive the end portion of an object under test; a rubber-like gasket having an aperture adapted to receive in tight-fitting relationship the end portion of an object under test;

means for clamping said gasket in fluid-tight relationship against the outer surface of said base, the apertures in said base and said gasket being aligned; and means for flowing into said inverted vessel a liquid in an amount sufficient to completely cover the end of an object under test but insufficient to fill said vessel; the portion of said vessel above the level of said liquid being adapted to be evacuated, so that leaks in the end of the container will be evidenced by bubbles arising in the liquid.

2. Apparatus for testing leakage of the end of a container comprising, in combination: a closed vessel having a transparent portion; an aperture in the bottom of said vessel, said aperture being adapted to receive the end portion of an object under test; a gasket assembly comprising, in combination, a plurality of rubber-like gaskets, and incompressible solid members between said gaskets, said assembly having an aperture adapted to receive in tight-fitting relationship the end portion of an object under test; means for clamping said gasket assembly in fluid-tight relationship against the outer surface of said bottom of the vessel, the apertures in said bottom and said gasket assembly being aligned; and means for flowing into said vessel a liquid in an amount sufficient to completely cover the end of an object under test but insufficient to fill said vessel; the portion of said vessel above the level of said liquid being adapted to be evacuated, so that leaks in the end of the container will be evidenced by bubbles arising in the liquid.

3. Apparatus for testing leakage of the end of a container comprising, in combination: a closed vessel having a transparent portion; an aperture in the bottom of said vessel, said aperture being adapted to receive the end portion of an object under test; a rubber-like annular gasket having an aperture adapted to receive in tight-fitting relationship the end portion of an object under test; means for clamping said gasket in fluid-tight relationship against the outer surface of said bottom of the vessel, the apertures in said bottom and said gasket being aligned; and means for flowing into said vessel a liquid in an amount sufficient to cover completely the end of an object under test but insufficient to fill said vessel; the portion of said vessel above the level of said liquid being adapted to be evacuated, so that leaks in the end of the container will be evidenced by bubbles arising in the liquid.

References Cited in the file of this patent

UNITED STATES PATENTS

| | | |
|---|---|---|
| 857,388 | Eno | June 18, 1907 |
| 1,547,126 | Maede | July 21, 1925 |
| 2,049,366 | Gardner | July 28, 1936 |
| 2,055,568 | Wilsdorf | Sept. 29, 1936 |
| 2,108,176 | Newby | Feb. 15, 1938 |
| 2,255,921 | Fear | Sept. 16, 1941 |
| 2,264,515 | Fear | Dec. 2, 1941 |
| 2,291,053 | Mull | July 28, 1942 |
| 2,346,423 | Gray | Apr. 11, 1944 |